Dec. 8, 1942.  A. GUDMUNDSEN  2,304,453
WATER SOFTENER
Filed June 9, 1939  3 Sheets-Sheet 1

Inventor
Austin Gudmundsen

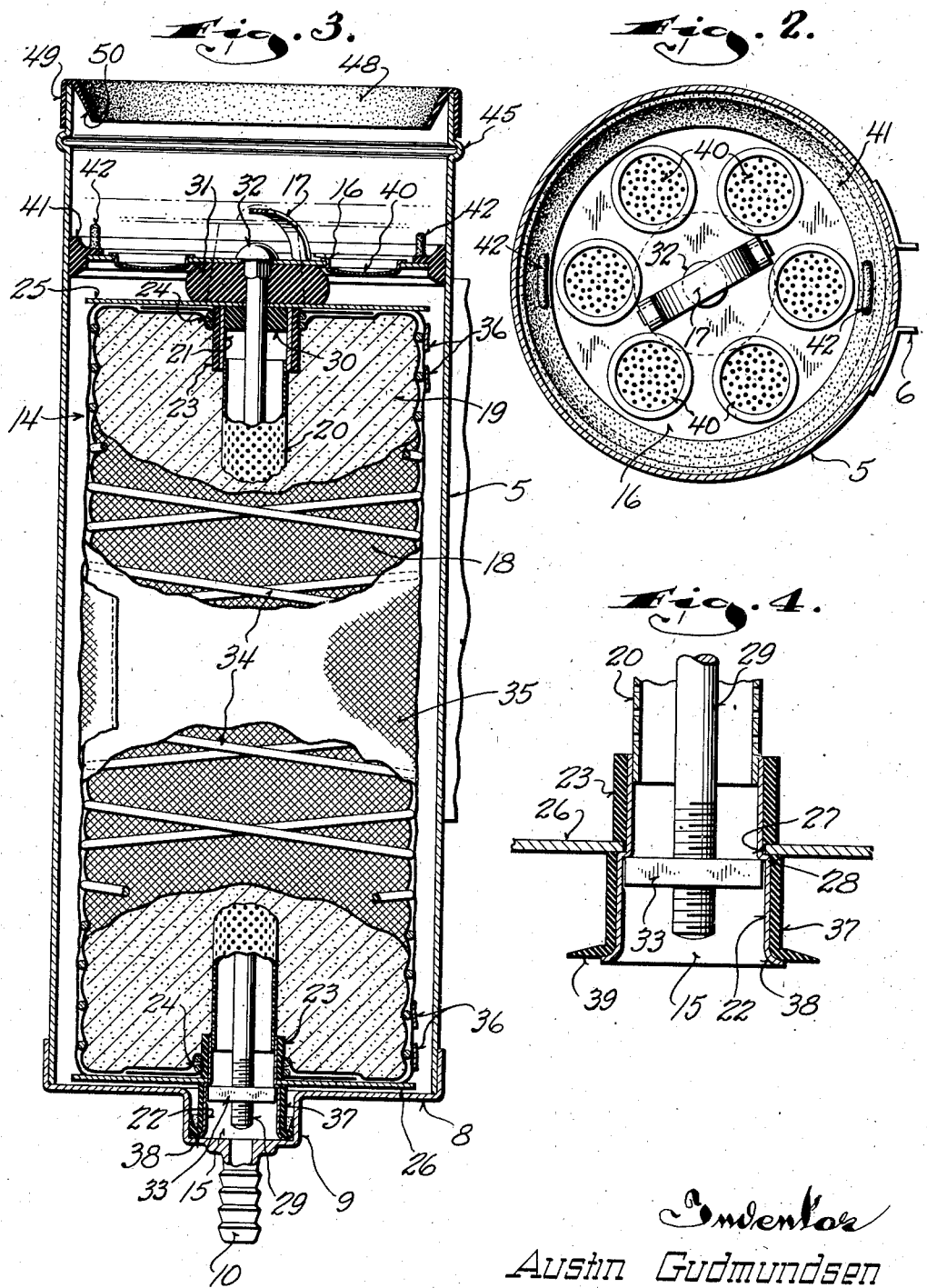

Dec. 8, 1942.                A. GUDMUNDSEN                2,304,453
                              WATER SOFTENER
                          Filed June 9, 1939          3 Sheets-Sheet 3
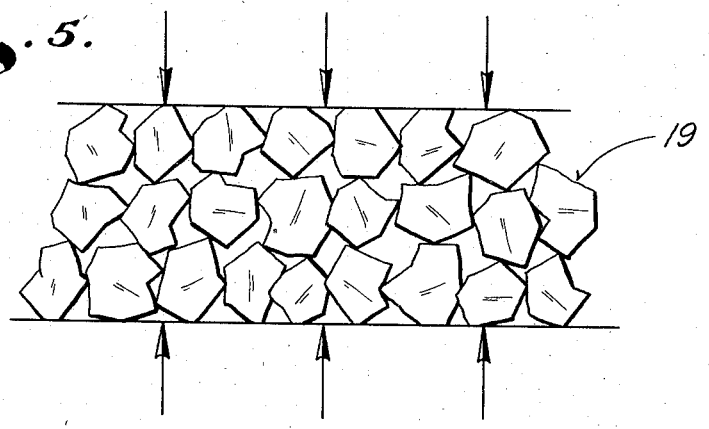
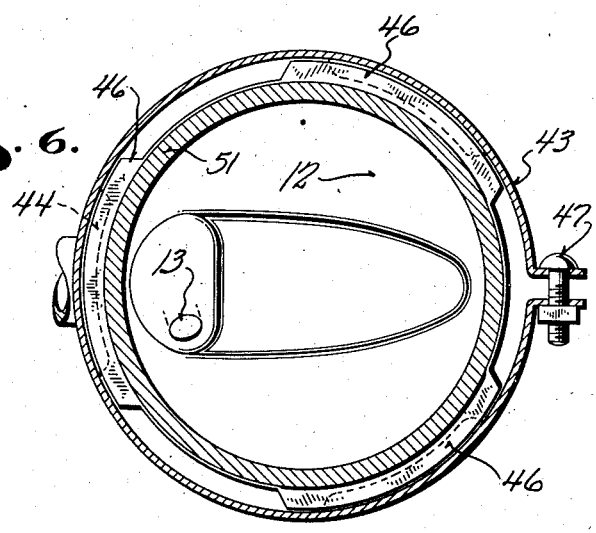
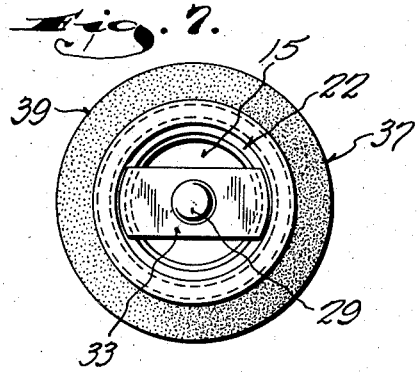
Inventor
Austin Gudmundsen Patented Dec. 8, 1942

2,304,453

UNITED STATES PATENT OFFICE 2,304,453

WATER SOFTENER

Austin Gudmundsen, Milwaukee, Wis., assignor to Gudmundsen-Stratton Laboratories, Inc., Milwaukee, Wis., a corporation of Wisconsin Application June 9, 1939, Serial No. 278,181

8 Claims. (Cl. 210—24)

This invention relates to water softeners and has a general object to provide a compact highly efficient zeolite water softener to be used as an adjunct to washing machines and other domestic types of washing equipment.

As is well known, the efficacy of a zeolite water softener depends upon the area of contact between the water and the zeolite mass or bed, and the rate at which the water flows through the zeolite. To be commercially practical for the purposes of this invention, the flow rate should not be less than the normal faucet flow rate.

Consequently, packing or orientation of the zeolite must be guarded against. Also, a large contact area must be provided within a comparatively small space. The use of fine grain zeolite (30-70 mesh) provides for the desired large surface area within the necessarily restricted volume, but inasmuch as fine grain zeolite is particularly subject to the objection of orientation and packing, this invention has as another of its objects to provide an improved manner of holding the zeolite mass in a definite fixed state at which the mass has the required degree of porosity to insure the desired high flow rate.

More specifically stated, it is an object of this invention to so confine the zeolite that points on the individual particles or grains embed themselves in surfaces of adjacent particles to thus lock the component parts of the mass against relative shifting or orientation.

Another object of this invention is to provide a water softener of the character described which is so designed that regeneration may be quickly and easily effected.

Another object of this invention is to provide a water softener having a readily removable zeolite cartridge which is so associated with its enclosing casing or shell that the water flows radially inwardly into the cartridge to be discharged from a central discharge tube.

Another object of this invention is to provide novel means for effecting a water-tight joint between the discharge tube of the removable cartridge and the outlet of the outer casing or shell, which is so designed as not to interfere with free withdrawal of the cartridge.

Another object of this invention resides in the provision of means for positively screening the water before it passes to the cartridge and to so mount the screening means as to permit easy removal thereof from the outer casing for cleaning.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 2 is a cross sectional view taken through Figure 1 on the plane of the line 2—2;

Figure 3 is a longitudinal sectional view through the outer casing of the unit, showing the removable cartridge therein, parts of which are broken away and in section, and the cover being removed from the casing;

Figure 4 is an enlarged detail sectional view of the lower end portion of the cartridge;

Figure 5 is a diagrammatic view to illustrate the manner in which the individual particles of zeolite are held against orientation;

Figure 6 is a cross sectional view taken through Figure 1 on the plane of the line 6—6; and Figure 7 is a detail view looking up at the bottom of the discharge port of the removable cartridge.

Figure 1:
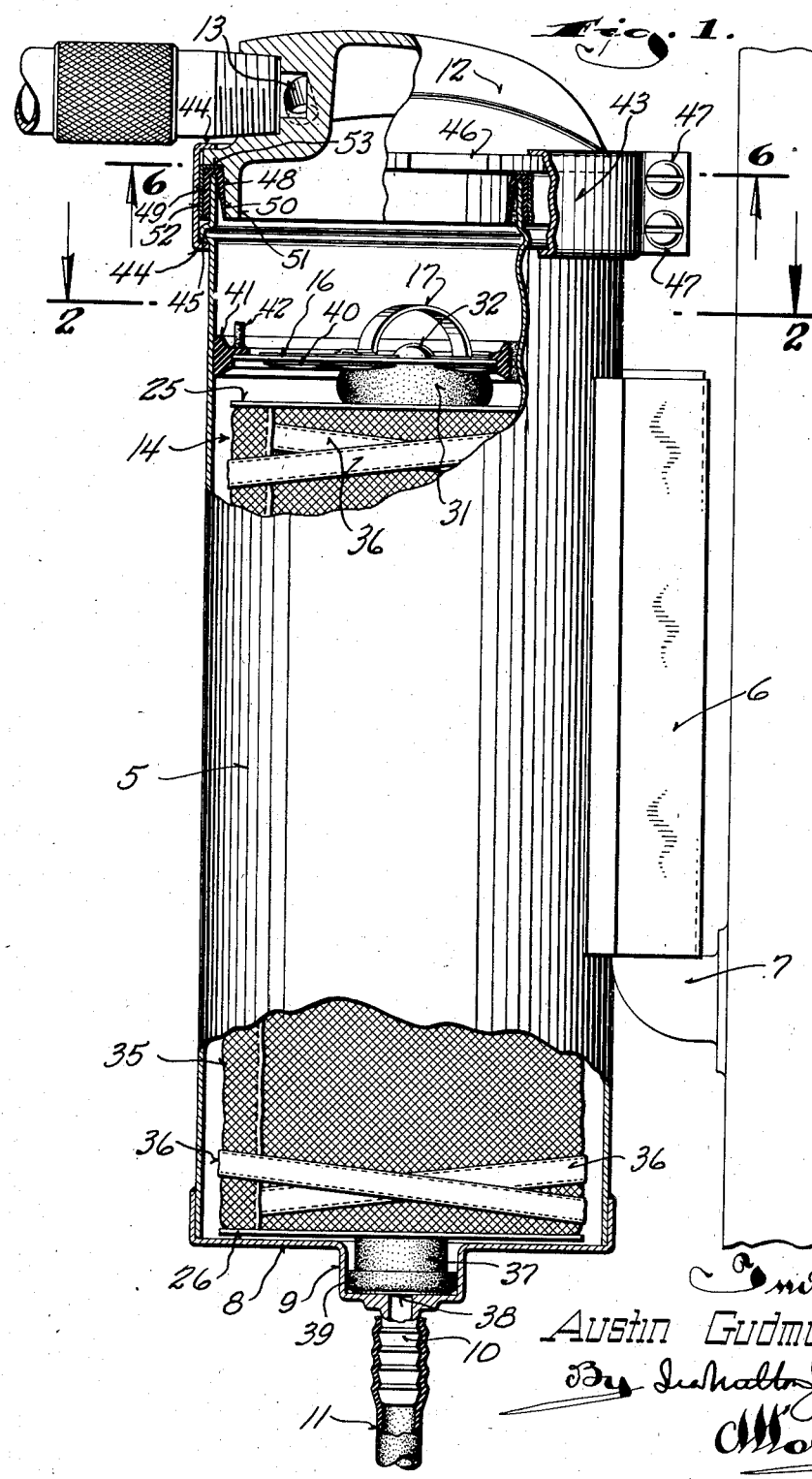
Figure 1 is a view partially in side elevation and partially in section through a water softener constructed in accordance with this invention.

Referring now particularly to the accompanying drawings in which like numerals indicate like parts throughout the several views, the numeral 5 designates the outer casing or shell of the complete softener unit, which when the device is intended to be used with a washing machine, has an attaching socket 6 fixed thereto to fit a supporting post 7 carried by the side of the washing machine.

The bottom of the outer casing or shell is cylindrical as shown, and is closed by a wall 8, the central portion of which is drawn out to form a cylindrical neck 9 terminating in a nipple 10 to which a hose 11 is attached. This hose, as will be readily apparent, may be positioned to discharge the softened water into the washing machine or into any other receptacle.

The upper end of the casing or shell is open to be closed by a removable cover 12. The cover, which is so attached to the shell as to be readily removable in a manner to be hereinafter described, has an inlet 13 for the water to be treated. This inlet, as best shown in Figure 6, is arranged to project the stream into the upper portion of the space defined by the cover and the adjacent part of the shell in a spiral manner so as to bathe the inner wall surfaces and wash down the salt deposited in the upper portion of the receptacle for regeneration.

Inside the shell is a removable cartridge, designated generally by the numeral 14. The water to be treated flows into the cartridge and after treatment is discharged therefrom through a discharge port 15 in the bottom thereof which fits into the neck 9 at the bottom of the shell.

The cartridge is held spaced from the inner wall of the shell or casing so as to afford access for the water to the entire outer surface of the cartridge, and to preclude undue clogging of the cartridge, a screen plate 16 extends across the casing or shell between the point of water admission and the cartridge. The screen plate 16 is removable from the shell together with the cartridge, for which purpose a handle 17 is attached to the plate.

Specifically, the cartridge 14 comprises a porous container 18, preferably of cloth or other suitable fabric, having a substantially cylindrical shape and containing a mass of fine grain zeolite 19. Extending centrally through the mass of zeolite is a perforated discharge tube 20. The upper end of the tube 20 is telescoped into a short sleeve 21, and its lower end is telescoped into the top of a sleeve 22. Both of these sleeves are covered with a layer of rubber or other similar material 23 to provide a resilient surface about which the ends of the container 18 are secured by tie wires 24.

Engaging the upper end of the container is an end plate 25 and abutting the lower end of the container is an end plate 26. The former extends across the upper end of the discharge tube, and the latter has a central hole 27 to receive the upper portion of the sleeve 22 and seat against a shoulder 28 formed by an abrupt enlargement of the sleeve 22 medially of its ends, as is clearly shown in Figure 4. The enlarged lower portion of this sleeve extends beneath the plate 26 to enter the neck 9 in the bottom of the shell.

The upper end plate 25, as stated, extends across the discharge tube, but has a small hole at its center for the reception of a tie rod 29 which extends longitudinally through the center of the discharge tube. A stopper or plug 30 in the sleeve 21 centers the tie rod with respect to the cartridge and closes the upper end of the discharge tube. The tie rod passes through the screen plate 16 and a block of highly resilient rubber 31 interposed between the screen plate and the adjacent end plate 25, and has its head 32 abutting the screen plate.

The lower threaded end of the tie rod has a nut member 33 threaded thereon which bears against the shoulder 28 so that upon drawing the nut member up on the tie rod, the cartridge is placed under endwise compression with the rubber block 31 deformed from its normal shape, indicated in dotted lines in Figure 3, to the shape shown in full lines. This very substantial compression of the live rubber block 31 insures the maintenance of the desired endwise pressure on the zeolite mass throughout the life of the cartridge.

In view of the fact that the perforated discharge tube 20 is shorter than the spacing between the end plates even after compression of the cartridge, and as its junction with the sleeves 21 and 22 permits relative sliding motion, it is evident that endwise compression of the mass is not opposed thereby.

Lateral expansion of the cartridge is prevented by binding the outside of the fabric container 18 with stout cords 34 spaced close enough to hold the unit firm against deformation.

The endwise compression of the mass being effected directly upon assembly of the parts, locks the individual grains or particles of zeolite which are from 30–70 mesh in size against orientation or relative shifting from a state at which the mass has substantial porosity. The manner in which this is accomplished is best shown in the diagrammatic illustration of Figure 5.

The individual particles or grains have tiny points and surfaces, and if placed under compression before the mass has had an opportunity to orientate, it is evident that these particles can be locked against relative motion by causing their points to bite into surfaces of adjacent particles. Normal handling of the unit or the cartridge per se thus does not destroy or alter the flow characteristics or efficacy of the unit in general. Maintenance of this desirable condition of the mass throughout the life of the cartridge is the function of the rubber block 31, as already stated. The expansive force stored in this block is adequate to take up any shrinkage in volume of the mass as the result of losses due to attrition or other causes.

While the screen plate removes most of any foreign substance in the water before it reaches the cartridge, the zeolite is further protected by the provision of a cloth envelope 35 wrapped about the cartridge and held in place by tie straps 36.

The entire cartridge is removably held in its proper position centered with respect to the casing or shell at its lower end by a juncture formed between the discharge port 15 and the neck 9, and at its upper end by the screen plate 16.

The junction between the discharge port 15 and the neck 9 must be water-tight to prevent untreated water passing out through the outlet. It must also be so constructed as not to interfere with easy withdrawal of the cartridge. To this end, the lower portion of the sleeve 22 is encircled by a rubber collar 37 held in place by an outward flange 38 on the lower end of the sleeve 22.

On the lower edge of this rubber collar is an outwardly extending annular flange 39, preferably feather edged so as to be light and highly flexible. The relative diameters of the collar 37 and the neck 9 are such that during the insertion of the cartridge, the annular flange 39 is folded upwardly to lie flat against the inner wall of the neck, as shown in Figure 3. This causes the flange 39 to hug the inner wall of the neck, and being thin and highly flexible, water pressure inside the shell forces the flange against the inner wall of the neck to positively prevent leakage.

The highly flexible characteristics of the flange 39 also allow the cartridge to be easily withdrawn without opposition from the junction at this point, for during withdrawal of the cartridge, the thin flexible flange 39 is easily peeled off the inner wall of the neck.

The screen plate 16 has a number of holes closed by screens 40, the combined capacity of which is sufficient to permit the water to flow through the screen plate at substantially the faucet flow rate.

As stated, this plate is held properly centered with respect to the cartridge so that by receiving support from the inner walls of the shell, the screen plate holds the cartridge centered with respect to the shell. For this purpose, a removable sealing ring 41 is provided. This ring is formed of rubber and fits between the outer peripheral edge of the screen plate and the adjacent inner wall of the shell. It is readily removable to permit withdrawal of the cartridge, and to facilitate such removal, grips or tabs 42 are formed on the ring as an integral part thereof.

The sealing ring 41 besides serving to hold the upper end of the cartridge properly centered also provides a water-proof junction between the outer edge of the screen plate and the inner wall of the shell so that all of the water must pass through the screens 40 and to the zeolite bed.

The cover 12 is readily removably held in place by means of a split clamping ring 43 which encircles the upper end portion of the shell and has the lower one of its two inturned flanges 44 engaging under a bead 45 formed in the shell. The upper inturned flange 44 is circumferentially interrupted at spaced intervals, but its remaining portions engage over lugs 46 on the cover. The clamping ring is drawn tightly about the shell by screws 47, as clearly shown in Figures 1 and 6.

Quick detachment of the cover is provided by turning it to align its lugs 46 with the spaces left by the interruptions in the upper flange 44 of the clamping ring. Likewise, application of the cover is quickly effected by passing the lugs 46 through the spaces in the upper flange 44 and turning the cover.

A liquid-tight joint is formed between the cover and the shell by means of a rubber gasket ring 48 fitted over the upper marginal edge of the shell. This gasket ring, as best shown in Figure 3, has an outer cylindrical flange 49 which overlies the outer surface at the upper marginal edge portion of the shell, and an inner more flexible flange 50 held by the tension of the rubber, when the cover is removed, in an inwardly inclined position, as shown in Figure 3. Hence, upon application of the cover, snug engagement is effected between this inner flange 50 and a downwardly extending annular wall or flange 51 on the bottom of the cover.

This arrangement also utilizes internal water pressure to increase the effectiveness of the seal, as will be readily apparent.

The rubber gasket is protected by a metal ring 52 having an inwardly directed flange 53 to cover the top of the gasket and provide a smooth surface with which the ledges 46 of the cover engage. This metal ring 52 also prevents the rubber gasket from being ballooned out through the spaces between the lugs 46 by water pressure.

During operation, the water, as pointed out hereinbefore, enters the inlet 13 and after passing through the screens 40 fills all of the ullage left within the shell by the cartridge 14. It then flows inwardly through the zeolite and into the perforated tube to pass out through the outlet in the bottom of the shell and be conducted by means of the hose 11 to its desired point of use.

To regenerate the zeolite mass, it is only necessary to remove the cover 12 and fill the cup-shaped chamber above the screen plate with a supply of ordinary salt. With the cover replaced, the water is then circulated through the unit as before, and entering the salt receptacle or chamber tangentially as it does, the salt laden water is given a whirling motion to more rapidly dissolve the salt and carry it down into the zeolite bed. This manner of introducing the water also insures complete use of all of the salt as it washes or bathes the walls of the salt receptacle to carry all of it down into the zeolite bed.

From the foregoing description taken in connection with the accompanying drawings, it will be readily apparent to those skilled in the art, that this invention provides a water softener specially adapted to use with washing machines and like washing appliances, and that it provides an entirely new manner of insuring high flow rates and maximum contact area between the water and the zeolite, thus making possible the use of fine grain zeolite in a commercially practical structure.

What I claim as my invention is:

1. In a water softener having a casing, a removable cartridge in the casing comprising: a flexible porous container; a mass of zeolite in the container; a perforated discharge tube extending axially through the mass of zeolite; an end plate engaging one end of the container; means carried by said end plate having a sliding engagement with the perforated tube to close the same while allowing movement of the end plate longitudinally with respect to the tube; an end plate engaging the opposite end of the container; means providing a connection between said last named end plate and the adjacent end of the tube allowing relative endwise motion therebetween; and a tie bolt passing through the perforated tube to draw the end plates together and maintain the mass of zeolite in a state of compression.

2. In a water softener: an open topped outer shell having a water outlet in its lower portion; a removable cartridge within the shell and having a discharge port connected with the water outlet of the shell; a cover to close the open top of the shell, said cover having a water inlet; means for readily detachably holding the cover on the shell; and means providing a liquid-tight seal between the cover and the shell comprising, a flange on the cover entering the shell with a space therebetween; and a rubber ring embracing the peripheral edge portion of the shell and having an inner flange closely engaging the flange of the cover and sufficiently resilient to be forced into close contact therewith by the water pressure.

3. In a water softener: a substantially cylindrical shell having an open top and a water outlet in the bottom, said water outlet including a depending neck portion opening to the inside of the casing and substantially coaxial with the shell; a removable cartridge comprising, a porous container; a mass of fine grain zeolite therein; and a discharge tube leading from the interior of the mass exteriorly of the lower end of the container; means on the lower end of the discharge tube engageable with the neck portion of the water outlet to provide a water-tight connection therebetween and hold the lower portion of the cartridge in proper position; a screen plate connected with the upper end of the cartridge extending substantially across the shell; a removable sealing ring between the peripheral edge portion of the screen plate and the inner wall of the shell to provide a liquid-tight joint therebetween and hold the upper end of the cartridge centrally disposed in the shell; a cover for the open top of the cylindrical shell having a watertight connection therewith; and means for introducing water into the cylindrical shell at a point above the screen plate.

4. A cartridge for a water softener comprising: a porous substantially cylindrical flexible container; a discharge tube inside the container having perforations providing an inlet to the tube and having one end projecting out through the container to provide an outlet; a mass of fine grain base exchange material filling the container around the tube and through which water entering the container flows radially toward the tube; and means for applying an endwise compressive force to the mass of base exchange material in the container to cause the individual particles of the base exchange material to lock each other against relative motion and thereby prevent orientation of the base exchange material during handling of the cartridge.

5. In a water softener, a unitary cartridge comprising: a substantially cylindrical cloth container; a mass of fine grain zeolite within the container; a perforated tube extending axially within the mass of zeolite and having one end opening to the exterior of the container so that water flowing radially inwardly through the cloth container and said mass of zeolite may enter the tube and discharge therefrom after being treated by its passage through the zeolite, end plates at the opposite ends of the container; and a tie bolt passing through the tube to draw the end plates together and place the mass of zeolite under an initial degree of endwise compression to prevent orientation of the zeolite grains during handling of the cartridge.

6. In a water softener, an outer shell having a water inlet and a water outlet: a removable cartridge in the shell having a perforated tube embedded therein one end of which opens to the exterior of the cartridge to provide a discharge port for the cartridge connectible with the water outlet of the shell upon insertion of the cartridge into the shell; a screen plate extending across the shell between the water inlet and the cartridge; and a readily removable sealing ring forming a watertight joint between the periphery of the screen plate and the inner wall of the outer shell.

7. In a water softener, an outer shell having a water inlet and a water outlet: a removable cartridge in the shell having a perforated tube embedded therein one end of which opens to the exterior of the cartridge to provide a discharge port for the cartridge connectible with the water outlet of the shell upon insertion of the cartridge into the shell; and yieldable sealing means carried by said end of the perforated tube providing the discharge port for the cartridge engageable with the water outlet of the shell upon insertion of the cartridge into the shell to preclude the passage of untreated water through the water outlet of the shell.

8. A water softener comprising: an open topped outer shell having water inlet and outlet openings, said outlet opening being located in the lower portion of the shell; a removable cartridge within the shell having a discharge communicating with the water outlet of the shell; a cover to close the open top of the shell; means for readily detachably holding the cover on the shell; and means providing a liquid tight seal between the cover and the shell comprising a flange on the cover entering the shell with a space therebetween; and a rubber ring embracing the peripheral edge portion of the shell and having an inner flange closely engaging the flange of the cover and sufficiently resilient to be forced into close contact therewith by water pressure within the shell.

AUSTIN GUDMUNDSEN.